(12) United States Patent
Helson et al.

(10) Patent No.: US 7,712,558 B2
(45) Date of Patent: May 11, 2010

(54) ROLLTAINER TRANSPORTER

(75) Inventors: Bart Helson, Scottsville, KY (US); James Martin, Oakland, KY (US)

(73) Assignee: MH Logistics Corp., Chillicothe, IL (US)

(*) Notice: Subject to any disclaimer, the term of this patent is extended or adjusted under 35 U.S.C. 154(b) by 147 days.

(21) Appl. No.: 11/851,369

(22) Filed: Sep. 6, 2007

(65) Prior Publication Data
US 2009/0065272 A1 Mar. 12, 2009

(51) Int. Cl.
B62D 51/04 (2006.01)
B62D 11/04 (2006.01)
B62D 61/08 (2006.01)
B60P 1/00 (2006.01)

(52) U.S. Cl. .................. 180/19.3; 180/19.1; 180/19.2; 180/6.5; 180/211; 414/495

(58) Field of Classification Search ............... 180/19.3, 180/19.1, 19.2, 6.5, 211; 414/495; D34/28
See application file for complete search history.

(56) References Cited

U.S. PATENT DOCUMENTS

| | | | | |
|---|---|---|---|---|
| 1,329,995 A * | 2/1920 | Oubridge | ................. | 254/10 C |
| 3,031,024 A * | 4/1962 | Ulinski | ................. | 180/6.5 |
| 3,042,421 A * | 7/1962 | Buske et al. | ............... | 280/81.6 |
| 3,179,196 A | 4/1965 | Richardson | | |
| 3,207,253 A | 9/1965 | Branning | | |
| 3,318,611 A | 5/1967 | Branning | | |
| 3,704,758 A * | 12/1972 | Cropp | ................. | 180/19.1 |
| 3,854,544 A | 12/1974 | Kolchev | | |
| 3,887,095 A * | 6/1975 | Suzuki | ................. | 414/680 |
| 4,266,903 A * | 5/1981 | Surbrook | ................. | 414/680 |
| 4,289,212 A * | 9/1981 | Immel | ................. | 180/19.1 |
| 4,289,299 A * | 9/1981 | Kameda | ................. | 254/8 B |
| 4,318,448 A * | 3/1982 | Cline | ................. | 180/14.1 |
| 4,629,391 A | 12/1986 | Soyk et al. | | |
| 4,973,206 A | 11/1990 | Engle | | |
| 5,259,471 A * | 11/1993 | Taylor et al. | ................. | 180/12 |
| 5,547,035 A * | 8/1996 | Berry | ................. | 180/19.2 |
| 5,573,078 A | 11/1996 | Stringer et al. | | |
| 5,580,207 A | 12/1996 | Kiebooms et al. | | |
| 6,244,366 B1 | 6/2001 | Otterson et al. | | |
| 6,290,010 B1 * | 9/2001 | Roudet et al. | ............. | 180/19.2 |
| 6,374,937 B1 * | 4/2002 | Galando et al. | ............. | 180/211 |
| 6,688,836 B2 * | 2/2004 | Gourand | ................. | 414/543 |
| 6,729,421 B1 | 5/2004 | Gluck et al. | | |
| 6,938,711 B2 | 9/2005 | Kime et al. | | |
| 7,021,407 B2 | 4/2006 | Ruschke et al. | | |

(Continued)

FOREIGN PATENT DOCUMENTS

DE    4205023 A1 *  8/1993

(Continued)

*Primary Examiner*—Lesley Morris
*Assistant Examiner*—Daniel Yeagley
(74) *Attorney, Agent, or Firm*—David J Bremer

(57) ABSTRACT

The invention is a transporter for moving a rolltainer, a trolley, and various other multi-wheeled containers that roll on a surface. The transporter utilizes lever-assisted rotating forks to lift and position the container to provide maximum traction, stability, and safety. The transporter utilizes hub motors for increased maneuverability and to eliminate drivetrain elements. The transporter is configured to keep transporter structure between the operator and the load during al operative modes to maximize operator safety.

16 Claims, 8 Drawing Sheets

U.S. PATENT DOCUMENTS

| | | | |
|---|---|---|---|
| 7,293,619 B2 * | 11/2007 | Mitchell, Jr. | 180/19.2 |
| 7,481,286 B2 * | 1/2009 | Ruschke et al. | 180/11 |
| 2004/0213656 A1 * | 10/2004 | Lear | 414/495 |
| 2006/0102392 A1 * | 5/2006 | Johnson et al. | 180/19.1 |
| 2007/0172341 A1 * | 7/2007 | Gregory | 414/495 |
| 2007/0221419 A1 * | 9/2007 | Willis | 180/19.1 |
| 2008/0101903 A1 * | 5/2008 | Waner et al. | 414/495 |
| 2008/0196951 A1 * | 8/2008 | Gal et al. | 180/65.1 |

FOREIGN PATENT DOCUMENTS

| | | |
|---|---|---|
| DE | 19947426 A1 * | 4/2001 |
| EP | 569988 A2 * | 11/1993 |

* cited by examiner

ROLLTAINER TRANSPORTER

The invention is a transporter for moving a rolltainer, a trolley, and various other multi-wheeled containers that roll on a surface. The transporter provides progress over the prior art, and does so via a compact, simple apparatus that emphasizes ease of use, stable and safe transporting of potentially heavy containers, and high maneuverability. The transporter includes a combination of powered and manual assistive features designed and configured to be intuitively operable.

The transporter configuration maintains physical separation between the operator and the container to maximize safe transporter operation. Additionally, the transporter connects securely to the container via connector forks and positions the container with respect to transporter drive wheels for maximum traction when the container is lifted and moving.

The transporter rolls on a tripodal wheel assembly. The wheel assembly includes a substantially rigid frame including a centered forward caster wheel and two transversely spaced-apart, steerable, rearward drive wheels.

Tripodal contact provided by the centered forward wheel and the spaced-apart rearward drive wheels ensures transporter stability when loaded. Positioning the connector forks proximal the spaced-apart drive wheels provides maximum stability when the container is lifted and moving.

A connector for connecting the transporter to the container is positioned medial the forward caster wheel and the rear drive wheels. The connector comprises connector forks for connecting to the container. The connector forks in use position the container proximal the spaced-apart drive wheels for maximum traction.

A transporter controller extends upward and rearward beyond the drive wheels so that an operator walks behind the transporter while controlling transporter movement.

Additionally, a lever-assisted foot pedal extends rearward beyond the drive wheel for rotating the connector to engage the container, so that the operator can approach the container, lift and move the container, while remaining safely behind the transporter. The operator does not have to move between the container and the transporter, and does not have to move adjacent the container and the transporter, while operating the transporter.

In use, the forward caster wheel passes beneath the container to bring the connector into proximity with the container. Engaging the container with the connector lifts the container upward and rearward so that the container load is positioned proximal the drive wheels yet medial the forward and rearward wheels. Moving the container rearward shifts the load onto the drive wheels and increases drive wheel traction. The medial position of the connector with respect to the forward and rearward wheels provides optimal load positioning for stable container movement.

The transporter provides progress over the prior art by configuring new and known elements in innovative ways to achieve unexpected results. The rotating, lifting, connector minimizes forward-positioned apparatus needed to lift and connect to the container. The connector maximizes traction at the drive wheels by moving the container towards the drive wheels while lifting the container onto the transporter. The tripodal wheel assembly with spaced apart, steerable, rearward, drive wheels provides progress over the prior art by maximizing stability under load and applying traction at two spaced-apart locations. Drive wheels comprising hub motors provide steerable drive wheels without complex drivetrains connecting wheels to a motor. The walk-behind design and the rearward-positioned foot pedal keep the transporter structure between the operator and the load during all operative modes to maximize operator safety. All these elements combine to produce a transporter that is more compact, safer and easier to operate than previously known.

DRAWINGS

Figure 1:
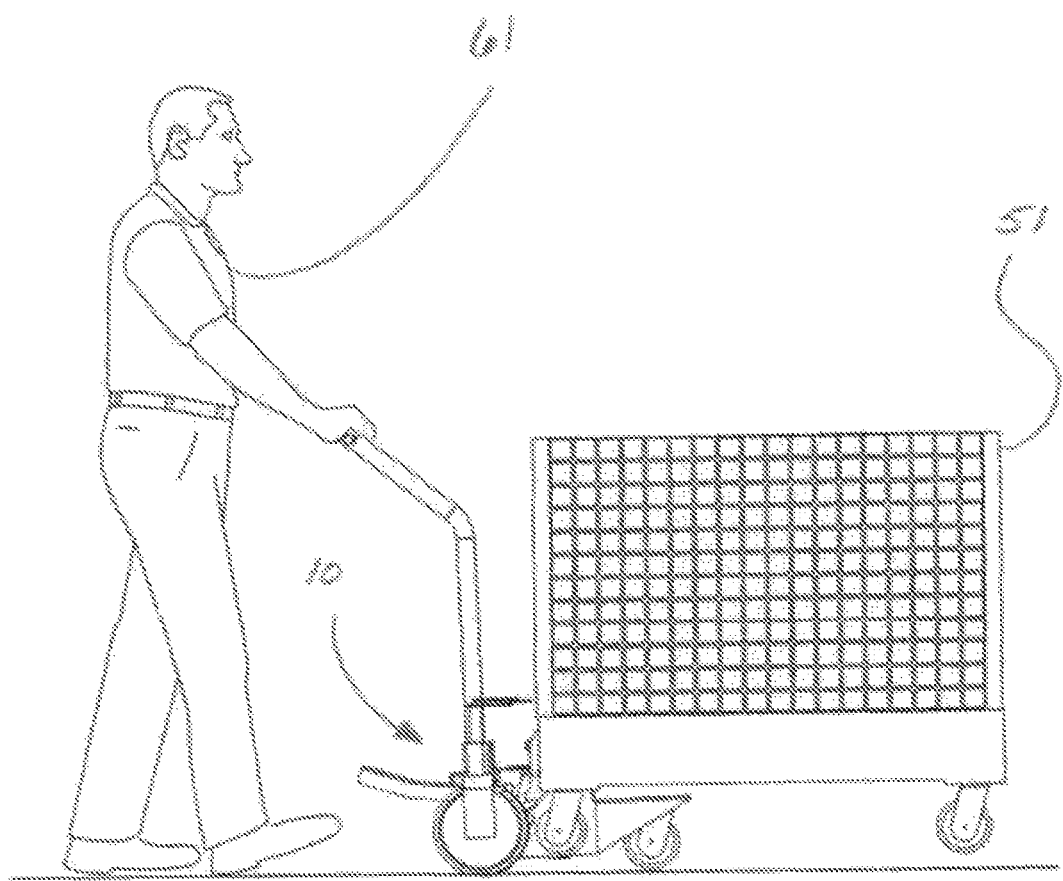
FIG. 1 is a side view of the transporter in use connected to a rolltainer.

As shown in FIG. 1, a transporter 10 is operable from a walk-behind position when providing motorized assistance for moving a container 51.

The transporter 10 comprises a tripodal wheel assembly including a rigid structural frame to provide sufficient strength for moving heavy containers. The tripodal wheel assembly provides three-point contact with the surface to ensure maximum stability. The wheel assembly includes a transversely centered forward caster wheel 11 and two transversely spaced-apart rearwards drive wheels, such as the drive wheels 12 and 13.

The tripodal support provided by the transporter 10 is distinguished from other transporters having four and more support wheels. It is recognized that transporters having four and more wheels can provide transitory three-point support until they deflect under load to enable a fourth wheel to contact the surface, and such redundant supports do not constitute tripodal support as it is used here. Similarly, some transporters having a central wheel and outrigger side wheels must lean under load to enable a third and a fourth wheel to contact the surface to attain stability. The transporter 10 provides superior and differentiable tripodal support due to the continuous and definite configuration of the support wheels under load.

The caster wheel 11 and the drive wheels 12 and 13 are positioned to provide tripodal contact with a support surface such as a floor, a roadway, and other support surfaces. The drive wheels are spaced-apart substantially transversely to a motion direction, for example a forward direction and a rearward direction. The forward caster wheel is substantially centered between the spaced-apart drive wheels. As used here and throughout, "caster wheel" includes multiple wheel casters where the wheels are close together and the wheels pivot about a common steering axis that is perpendicular to their axes of rotation.

Tripodal support eliminates rocking and leaning that can occur with redundant contact configurations, for example, configurations with four wheels and more wheels.

Additionally, the sideways-spaced-apart, steerable, drive wheels provide maximum side-to-side stability and improved traction over similarly spaced-apart passive wheels.

Each drive wheel comprises an electric hub motor. A hub motor is an electric motor built directly into the hub of a wheel. Electric hub motors have a non-rotating stator and a rotating outer hub for a rotor. Typically, a tire is fixed to the outer hub. Hub motors require no additional transmission system, thereby increasing the overall efficiency of the transporter. Additionally, hub motors enable the drive wheels to be steerable without complex drivetrains and universal joints connecting the wheels to a common motor.

Hub motor drive wheels can be steerable by pivoting the drive wheel about a drive wheel steering axis that is perpendicular to the hub motor stator. The drive wheels 12, 13 each can pivot about a drive wheel steering axis.

The hub motors can be powered by an on-board battery, for example by a battery carried in a battery housing 15.

The transporter has a container connector 20 mounted medial the caster wheel 11 and the drive wheels 12, 13. The connector 20 extends transversely from the center of the transporter towards the spaced-apart drive wheels. The connector is positioned to ensure that a container 51 loads the transporter between the forward caster wheel and the rearward drive wheels.

Figure 5:
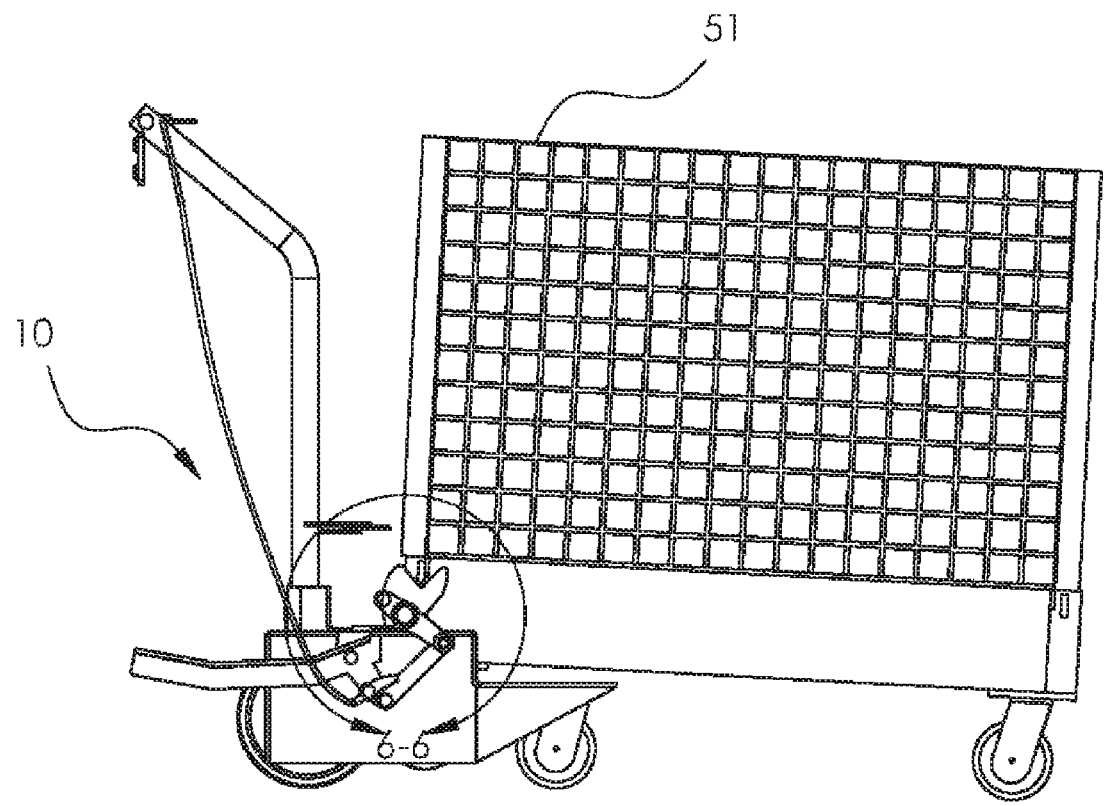
FIG. 5 is a side view of the transporter connected to a rolltainer.

As shown in FIG. 5, the connector 20 rotates between a capture position where the container is connected to the transporter and a release position where the container can move freely with respect to the transporter.

The connector 20 includes a central tube 24 rotatably mounted medial the caster wheel 11 and the drive wheels 12, 13. The connector 20 rotates to the capture position via a lever-assisted foot pedal 21 operating the connector via connector linkage 25. The pedal 21 extends rearwards from the transporter so that the pedal is operable from behind the transporter. The pedal 21 provides leverage to reduce force necessary to rotate the connector while connecting to a container, thereby eliminating the need for a power-assisted lift mechanism.

Alternatively, the connector 20 can rotate via a lever-assisted hand control, and by various other lever-assisted mechanisms, so long as the lever-assisted mechanisms extend rearwards from the transporter.

The connector includes two connector forks, such as the forks 22, 23, for engaging a container undercarriage component, for example the undercarriage component 52. The forks are transversely spaced-apart so that the forks 22, 23 are each proximal a drive wheel 12, 13. The spaced-apart forks provide side-to-side stability by supporting the container at the spaced-apart forks with a container center-of-gravity substantially between the supporting forks and between the spaced-apart drive wheels. The spaced-apart forks minimize side-to-side tipping that can occur with a single, centrally-positioned connector. Side-to-side stability can be critical when the container is tall and heavily loaded. Additionally, the spaced-apart forks limit side-to-side container movement and so maintain a container center of gravity between the supporting forks and between the spaced-apart drive wheels.

Figure 3:
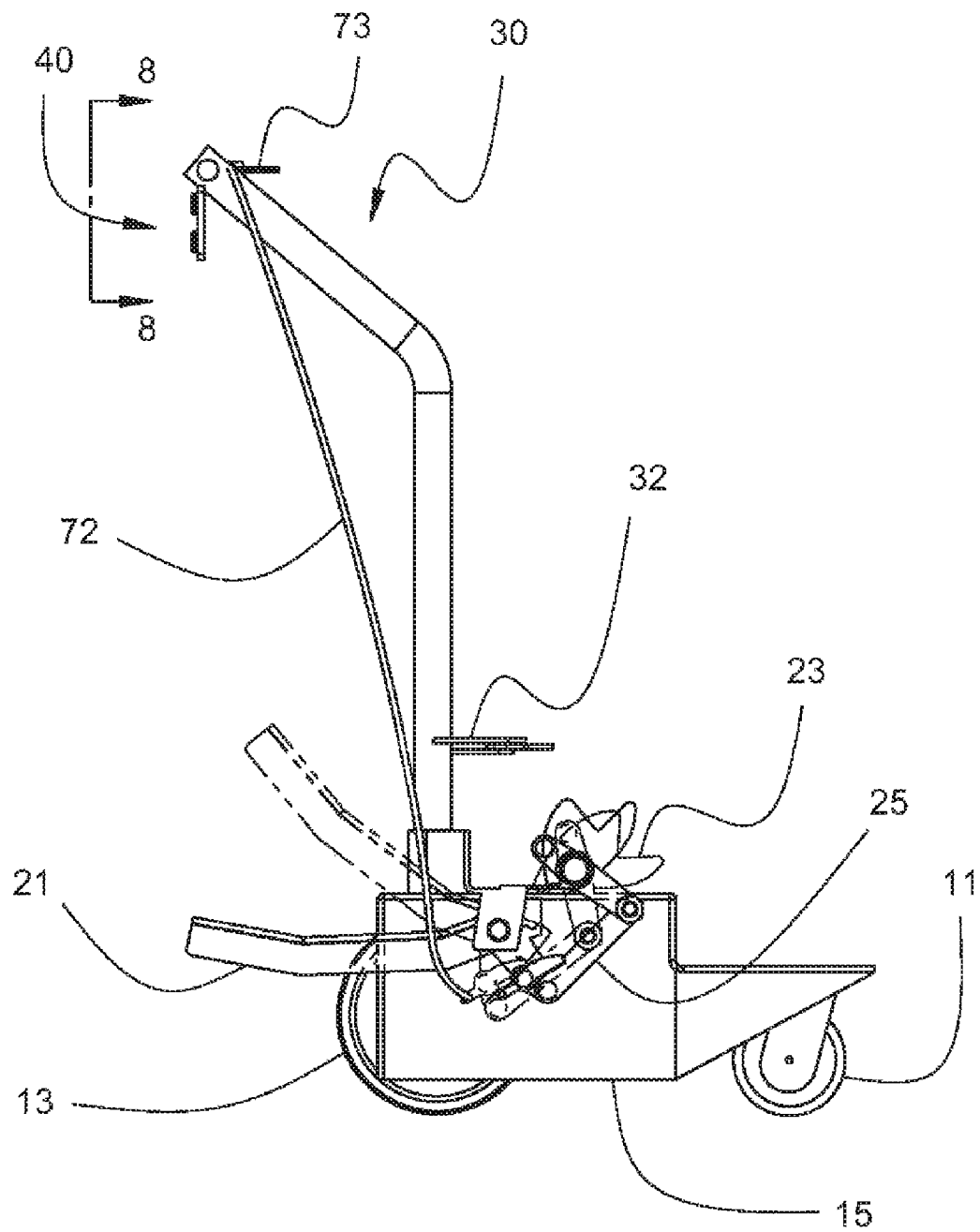
FIG. 3 is a cutaway side view of the transporter showing connector rotation.

As shown in FIG. 3, the forks in use lift the carriage upwards as the connector rotates from the release position to the capture position. The forks lift the container so that at least a container wheel is lifted off the ground. Lifting the container shifts the container load from the container wheel to the transporter and to the transporter drive wheels.

As shown in FIG. 3, the forks, as the connector rotates to the capture position, lift the carriage towards the drive wheels as the connector rotates from the release position to the capture position. Lifting the container towards the drive wheels increases the container load on the drive wheels and maximizes traction between the drive wheels and the surface.

The forks in use in the capture position cradle the undercarriage component to limit forward and rearward container movement with respect to the transporter. The connector and the forks are configured to securely connect the container to the transporter and to limit container movement with respect to the transporter.

The transporter has a controller for controlling transporter movement. The controller 30 extends upwards and rearwards from the transporter to ensure the transporter structure remains between the operator 61 and the container 51 during all operative modes.

Figure 2:
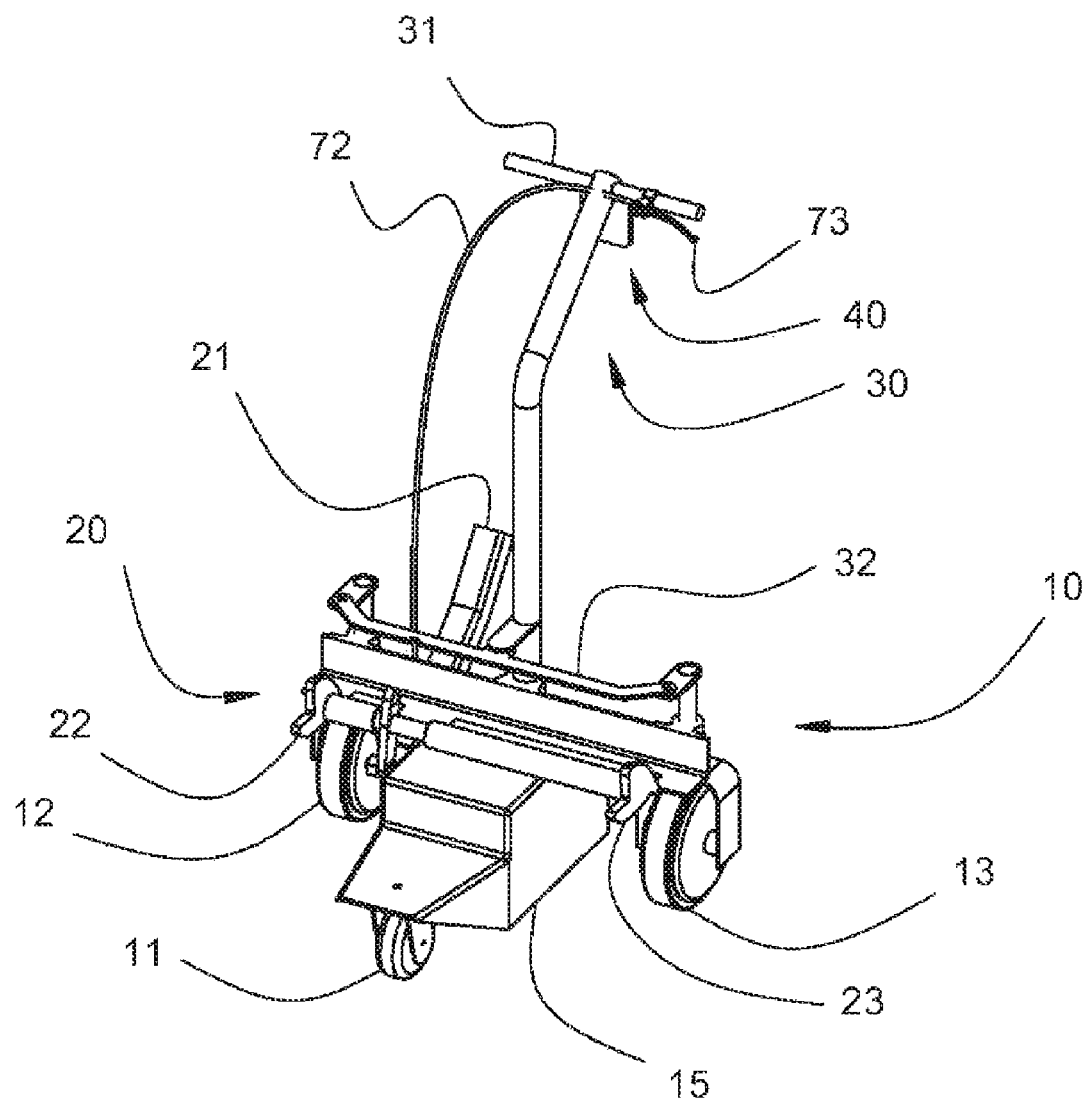
FIG. 2 is an isometric view of an embodiment of the transporter.
Figure 4:
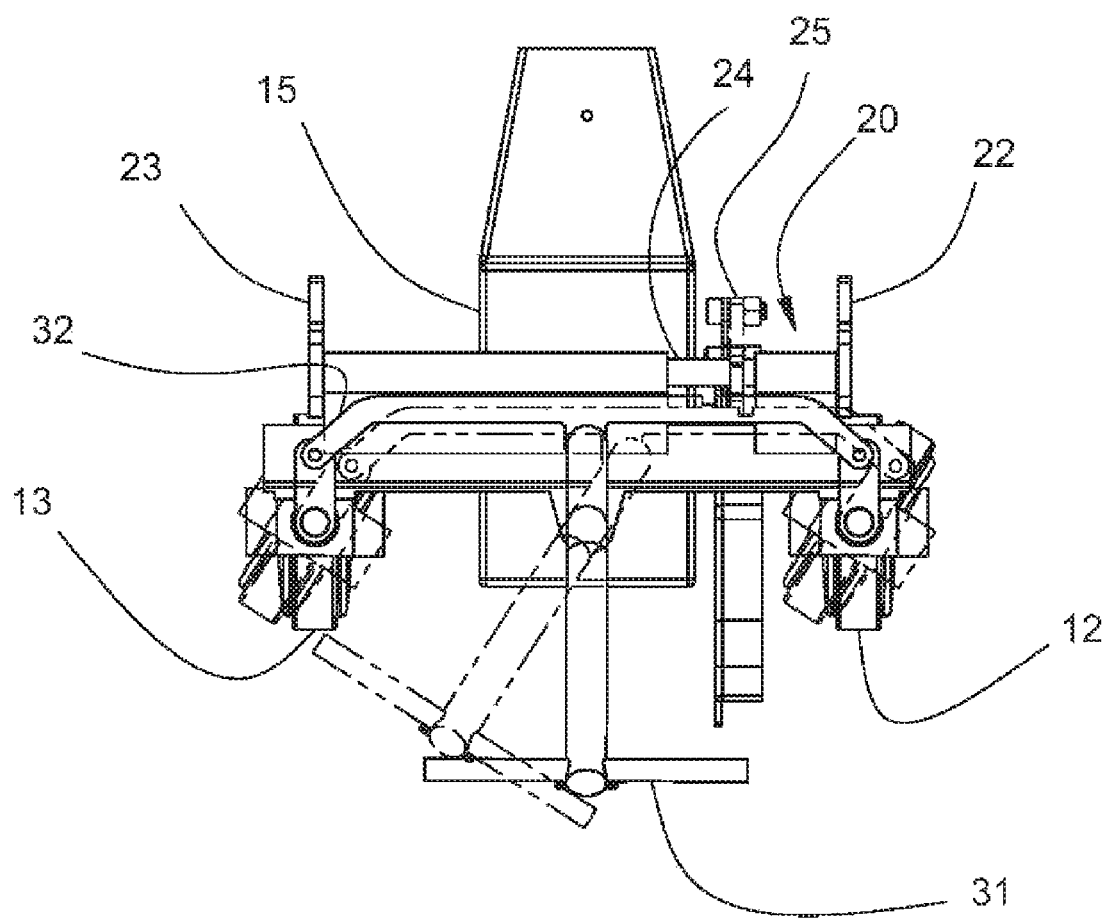
FIG. 4 is a view from above the transporter showing the controller motion for steering.

The controller comprises a steering component for steering the transporter. As shown in FIG. 2, the steering component can be a handle 31 connected to the steerable drive wheels via a steering linkage 32. FIG. 4 shows the steering component in use steering the drive wheels 12,13.

The steering linkage 32 couples the drive wheels 12,13 to the steering component to cause each drive wheel to pivot about its drive wheel steering axis.

Various other steering components can be utilized. The steering component can be a joystick, a wheel, a tiller, at least one electric switch, and combinations thereof.

Figure 8:
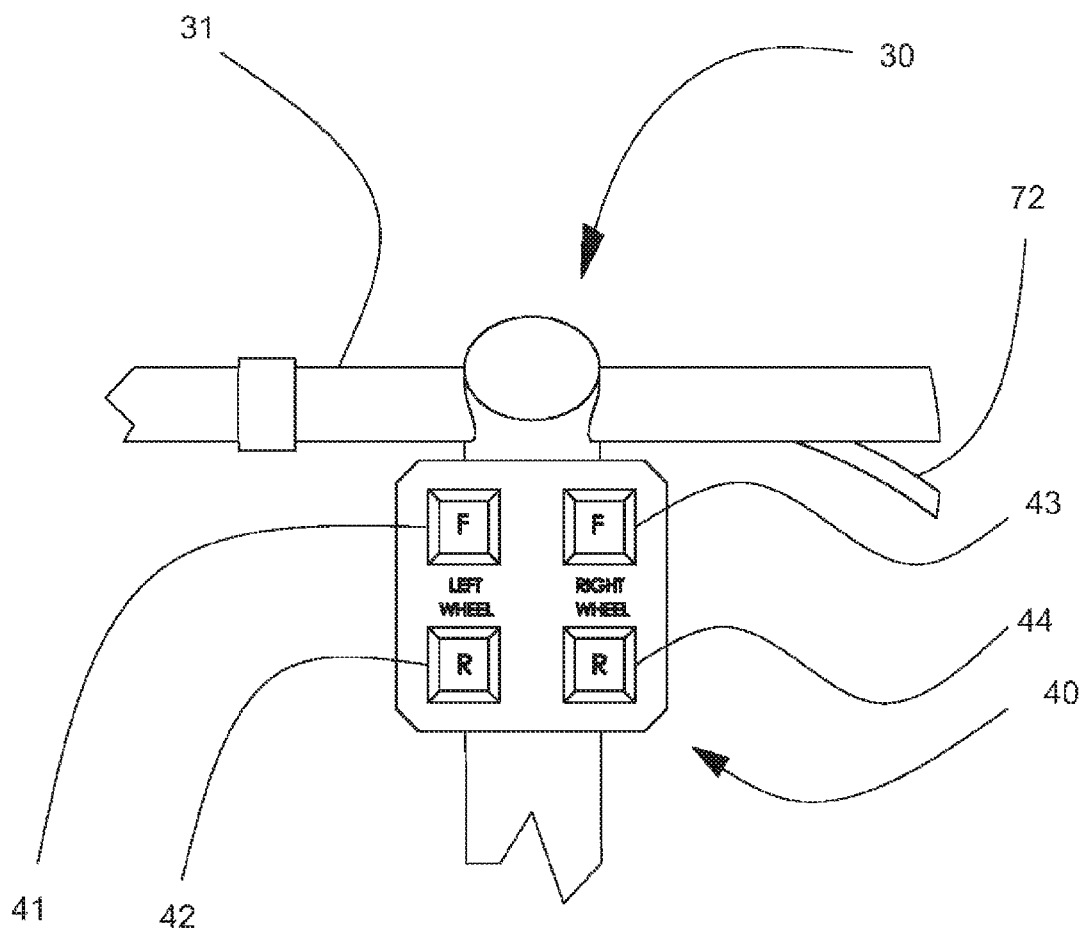
FIG. 8 is a view along line 8-8 showing the drive component.

The controller comprises a driving component for controlling hub motor rotation. As shown in FIG. 8, the driving component 40 can comprise an electric switch that causes a hub motor to rotate and move the transporter forward, such as the forward switch 41. The driving component can comprise an electric switch that causes a hub motor to rotate and move the transporter rearward, such as the rearward switch 42.

The driving component can comprise a joystick component for controlling hub motor rotation. Alternatively, the driving component can be voice activated. Various other driving components and combinations thereof can be utilized for controlling hub motor rotation.

The driving component can comprise a first driving component for controlling a first hub motor, and a second driving component for controlling a second hub motor. The driving component 40 has a first driving component comprising the switch 41 for moving the left motor forward and the switch 42 for moving the left motor rearward. The driving component 40 has a second driving component comprising the switch 43 for moving the right motor forward and the switch 44 for moving the right motor rearward.

A driving component can be both a driving component and a steering component by causing hub motors to rotate at different speeds with respect to each other.

Figure 6:
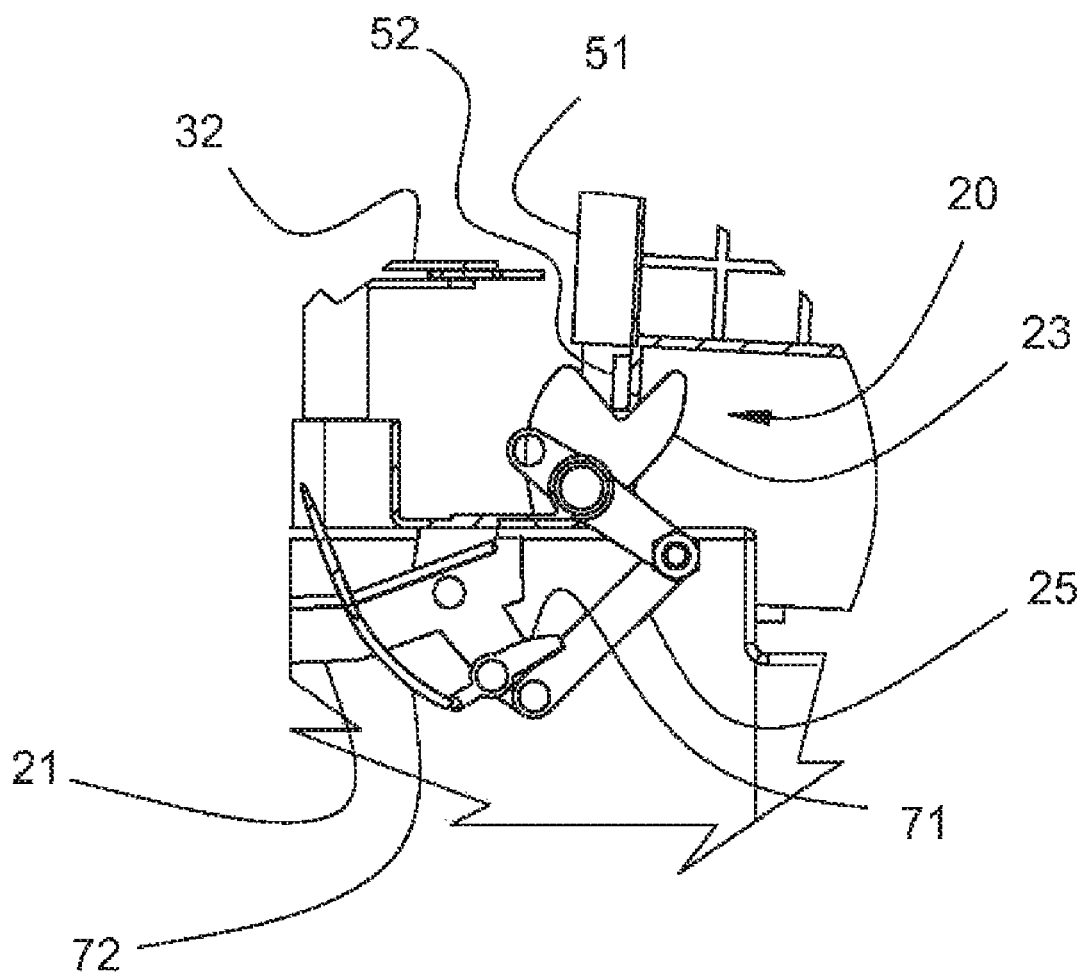
FIG. 6 is a cutaway side view from detail 6-6 showing the connector and forks in the capture position.

The transporter can have a lockable container connector. The container connector 20 can be locked in the capture position via the pawl 71. As shown in FIG. 6, the pawl 71 acts upon the connector linkage to block the connector from rotating from the capture position to the release position. The pawl can be mechanically biased to lock the connector when the connector rotates to the capture position.

Figure 7:
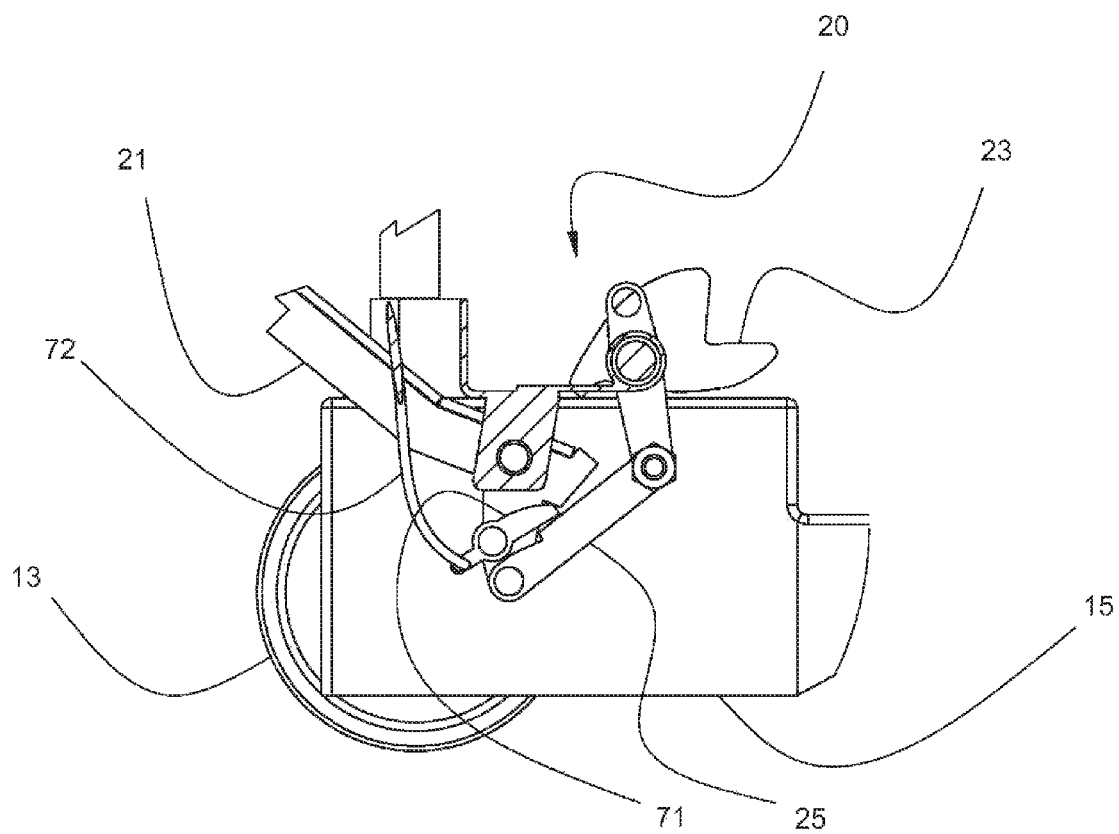
FIG. 7 is a cutaway side view showing the connector and forks in the release position.

The pawl 71 can be unlocked via a cable-connected actuator, for example the cable-connected grip 73. The grip 73 connects to the pawl via the push-pull cable 72. FIG. 7 shows the pawl 71 unlocked.

The pawl can be unlocked via a foot pedal, a hand lever, a solenoid switch, and various unlocking actuators and combinations thereof.

The invention claimed is:

1. A motorized, walk-behind transporter for moving a rolltainer, a trolley, and various other multi-wheeled containers that roll on a surface, the transporter comprising:
 a tripodal wheel assembly in use rolling on the surface, the wheel assembly comprising:
  a forward, transversely centered, caster wheel;
  two rearward, transversely spaced-apart, steerable, drive wheels,
  each drive wheel comprising an electric hub motor;

a rotating, lever-assisted container connector,
the connector being positioned medial the forward and rearward wheels;
the connector rotating between a capture position and release position;
the connector comprising:
at least two transversely spaced-apart, forks for engaging a container undercarriage component,
the forks being positioned always medial the forward and rearward wheels;
the forks lifting the undercarriage component upwards and towards the drive wheels as the connector rotates from the release position to the capture position;
the forks lifting the undercarriage component so that at least one container wheel is lifted from the surface;
the forks lifting the undercarriage component so that at least another container wheel rolls on the support surface and contacts the surface forward of the caster wheel;
the forks in the capture position cradling the undercarriage component to limit forward and rearward container movement with respect to the transporter;
a transporter controller,
the controller mounted upwards and rearwards beyond the drive wheels;
the controller comprising:
a steering component for drive wheel steering; and
a driving component for controlling hub motor rotation.

2. The transporter of claim 1 wherein the at least another container wheel is a non-steerable, fixed-direction wheel.

3. The transporter of claim 1 wherein the transporter controller comprises:
a first driving component for controlling a first hub motor rotation; and
a second driving component for controlling a second hub motor rotation.

4. The transporter of claim 1 wherein the drive wheels comprise a first drive wheel with a first hub motor and a second drive wheel with a second hub motor; and where the first hub motor and the second hub motor rotate the first drive wheel and the second drive wheel at different speeds, respectively, in response to varying frictional loads on each drive wheel.

5. The transporter of claim 1 wherein the controller is mounted medial the drive wheels.

6. The transporter of claim 1 wherein the wheel assembly, the container connector, and the transporter controller are configured so that when the transporter is in use with a container connected to the container connector, a user, the transporter, and the container move together rearward and forward in single file with the transporter always medial the container and the user.

7. A motorized, walk-behind transporter for moving a rolltainer, a trolley, and various other wheeled containers, the transporter comprising:
a tripodal wheel assembly in use rolling on the surface, the wheel assembly comprising:
a forward caster wheel;
a first rearward, steerable drive wheel, the first drive wheel steering by pivoting about a first drive wheel steering axis;
a second rearward, steerable drive wheel, the second drive steering by pivoting about a second drive wheel steering axis;
the first drive wheel steering axis and the second drive wheel steering axis both residing in a steering plane;
the caster wheel and the drive wheels contacting the surface at points on a rolling plane;
a travel plane;
the travel plane being orthogonal to the steering plane and orthogonal to the rolling plane and extending in a forward direction and a rearward direction;
a first electric hub motor rotating the first drive wheel at a first drive speed;
a second electric hub motor rotating the second drive wheel at a second drive speed;
the first hub motor and the second hub motor adjusting drive speeds independently in response to varying frictional loading on the drive wheels when turning at an angle to the travel plane;
the first hub motor adjusting the first drive speed independently of the second drive speed in response to varying frictional loads on the first drive wheel;
the second hub motor adjusting the second drive speed independently of the second drive speed in response to varying frictional loads on the second drive wheel;
the independent first drive speed and independent second drive speed facilitating radial turning of the transporter and container;
a rotating, locking, lever-assisted container connector,
the connector being positioned medial the forward and rearward wheels;
the connector rotating between a capture position and release position via a foot pedal extending rearwards beyond the rear wheels;
the connector being lockable in the capture position;
the connector comprising:
at least two transversely spaced-apart, aligned, connector forks for engaging a container undercarriage component,
the forks being positioned always medial the forward and rearward wheels;
the forks lifting the undercarriage component upwards and towards the drive wheels as the connector rotates from the release position to the capture position;
the forks lifting the undercarriage component so that at least one container wheel is lifted off the surface;
the forks in the capture position cradling the undercarriage component to limit forward and rearward container movement with respect to the transporter;
a transporter controller,
the controller mounted upwards and rearwards beyond the rear wheels;
the controller comprising:
a steering component for drive wheel steering; and
a driving component for controlling hub motor rotation.

8. The transporter of claim 7 wherein the connector further comprises:
the forks lifting the undercarriage component so that at least another container wheel rolls on the support surface and contacts the surface forward of the caster wheel.

9. The transporter of claim 7 wherein the at least another container wheel is a non-steerable, fixed-direction wheel.

10. The transporter of claim 7 wherein the controller is mounted medial the drive wheels.

11. The transporter of claim 7 wherein the wheel assembly, the container connector, and the transporter controller are configured so that when the transporter is in use with a container connected to the container connector, a user, the transporter, and the container move together rearward and forward in single file with the transporter always medial the container and the user.

12. A motorized, walk-behind transporter for moving a rolltainer, a trolley, and various other multi-wheeled containers that roll on a surface, the transporter comprising:
- a tripodal wheel assembly in use rolling on the surface, the wheel assembly comprising:
  - a forward, transversely centered, caster wheel;
  - a first rearward, transversely spaced-apart, steerable, drive wheel;
  - a second rearward, transversely spaced-apart, steerable drive wheel;
  - each drive wheel comprising an electric hub motor;
- a rotating, lever-assisted container connector,
- the connector being positioned medial the forward and rearward wheels;
- the connector rotating between a capture position and release position;
- the connector comprising:
  - at least two transversely spaced-apart, forks for engaging a container undercarriage component,
  - the forks being positioned always medial the forward and rearward wheels;
  - the forks lifting the undercarriage component upwards and towards the drive wheels as the connector rotates from the release position to the capture position;
  - the forks lifting the undercarriage component so that at least one container wheel is lifted from the support surface;
  - the forks in the capture position cradling the undercarriage component to limit forward and rearward container movement with respect to the transporter;
- a transporter controller,
- the controller mounted upwards and rearwards beyond the drive wheels;
- the controller comprising:
  - a steering component for drive wheel steering;
  - a driving component for controlling hub motor rotation;
  - the driving component causing undifferentiated rotation of both hub motors; and
  - the hub motors facilitating steering the transporter radially by providing differential rotation in response to frictional loads on the first drive wheel differing from frictional loads on the second drive wheel.

13. The transporter of claim 12 wherein the connector further comprises:
- the forks lifting the undercarriage component so that at least another container wheel rolls on the support surface and contacts the surface forward of the caster wheel.

14. The transporter of claim 13 wherein the at least another container wheel is a non-steerable, fixed-direction wheel.

15. The transporter of claim 12 wherein the controller is mounted medial the drive wheels.

16. The transporter of claim 12 wherein the wheel assembly, the container connector, and the transporter controller are configured so that when the transporter is in use with a container connected to the container connector, a user, the transporter, and the container move together rearward and forward in single file with the transporter always medial the container and the user.

* * * * *